June 20, 1944. G. B. SAYRE 2,351,713
MOLDING
Filed Dec. 21, 1938 4 Sheets-Sheet 4

INVENTOR
GORDON B. SAYRE
BY
ATTORNEY

Patented June 20, 1944

2,351,713

UNITED STATES PATENT OFFICE 2,351,713

MOLDING

Gordon B. Sayre, Brooklyn, N. Y., assignor to Boonton Molding Company, Boonton, N. J., a corporation of New Jersey Application December 21, 1938, Serial No. 247,017

23 Claims. (Cl. 18—30)

This invention relates to molding, and more particularly to an improved pill press, and more especially, to a combination of such a pill press with a molding press.

The primary object of my invention is to generally improve molding, and more especially, the molding of plastics.

In molding plastics, it is customary to preliminarily compress the molding powder in measured amounts into preforms or so-called "pills." These preforms are made up in large quantities and are delivered to the operator of the molding press who inserts the same in the mold cavities and then operates the press to close the mold. Difficulty arises because of non-uniformity in the cavities of a multiple cavity mold. The variation in the mold cavities is serious and may amount to ten per cent. This shows up in the actual weights of the finished pieces, such as bottle caps. The difficulty might be overcome or minimized by greater precision, and consequently, greater expenditure of money, in making the multiple cavity molds, but, unfortunately, the molds are extremely expensive even now, and manufacturers complain of mold expense even with the present relatively inaccurate molds. If the pill is too light for the mold cavity, a defective piece results, and if the pill is too heavy, there is excess flash, which wastes material and is troublesome, and adds to the necessary finishing of the piece. In accordance with the present practice, the pill must be made to take care of the largest mold cavity, thus creating excessive flash and waste of material throughout the remaining mold cavities.

One important object of the present invention is to overcome the foregoing difficulties and to make the preforms or pills conform to the necessary weight of material for each particular mold cavity. With this object in view, I form the pills in a pill press having multiple pill cavities which are so relatively located as to correspond with the mold cavities. I employ a pillboard having pill-carrying parts which register with the pill cavities and the mold cavities, and which are thereby adapted to receive the pills directly from the pill cavities and to transfer the same to the mold cavities, so that the pill formed in any particular pill cavity is invariably transferred to one corresponding mold cavity. Moreover, I provide means associated with the pill press to independently adjust the mass of the pills so that they may be graduated to compensate for variations in the mold cavities. In this way, each pill is "custom-made" to fit the particular mold cavity to which it is subsequently delivered.

It has heretofore been suggested to preheat the pills in order to reduce the curing time in the mold. However, preheating of thermoplastic materials is a difficult and critical procedure because the materials cure, and unless the time and temperature are accurately controlled, the materials may stiffen enough to prevent molding and even to damage the mold. When preheating is used, the pills are heated in ovens and are then carried to the molding press. Any interruption in the established preheating and molding cycle may leave the pills under heat in the oven somewhat longer than planned, and the oven temperature is, therefore, kept low, and the amount of preheat is minimized in order to allow for considerable delay without running into trouble at the molding press. The materials, therefore, have never been subjected to the optimum amount of preheating.

A further object of my invention is to overcome this difficulty and to provide the pills with the proper amount of preheating. This greatly assists the molding process because an appreciable percentage of the molding time is consumed in transmitting the mold heat throughout the mass of the pill in order to make the material viscous enough to flow into the final shape of the mold cavity as the mold is closed. In accordance with the present invention, the pill cavities are heated, preferably with electric elements, under thermostatic control. This heat is transmitted to the molding powder and to the pill as the powder is compressed into pill form, hence the heat penetrates the pill and is nearly uniform. The pills are transferred directly from the pill press to the molding press, there being one pill-forming operation for each molding operation, and the temperature and time may, therefore, be determined and maintained at substantially uniform values. The molding time is reduced greatly because of the introduction of the hot pills, and the quality of the molded pieces is greatly improved.

In effect, I practice a two-stage molding operation in two connected presses, the molding powder being heated and compressed and partially cured in the first press, and then being bodily transferred to the second press, where the material is further heated and compressed to complete reaction in finished shape. The necessary total curing time is divided between the two presses. During the transfer there is an excellent opportunity for gases to escape, hence "bumping" at the main press to vent the mold is unnecessary.

While it is convenient to speak of multiple mold cavities supplied from equivalent multiple pill cavities, it will be understood that the same principles may be used in supplying a plurality of pills or preforms to a single large complex mold cavity, the pills being suitably dimensioned and located for best results in the completed product. A variety of shapes and sizes of preform may be used, something which would be difficult in conventional practice because the bench of the operator would be cluttered up with too many kinds of pills, and he would have to select and place the same carefully in the mold. It would also be costly to make such a variety of pills. These disadvantages are overcome when combining a special pill press with the molding press, as above described.

Another advantage of the present invention is that the opening or the stroke of the molding press may be minimized. Instead of opening the press wide in order to facilitate manual loading of pills, the opening may be limited to the amount needed to strip the finished pieces onto a thin catchboard and to deliver the pills by means of a thin pillboard.

To the accomplishment of the foregoing and other more specific objects which will hereinafter appear, my invention consists in the molding press and connected pill press elements, and their relation one to the other, as hereinafter are more particularly described in the specification and sought to be defined in the claims. The specification is accompanied by drawings, in which:

Figure 1:
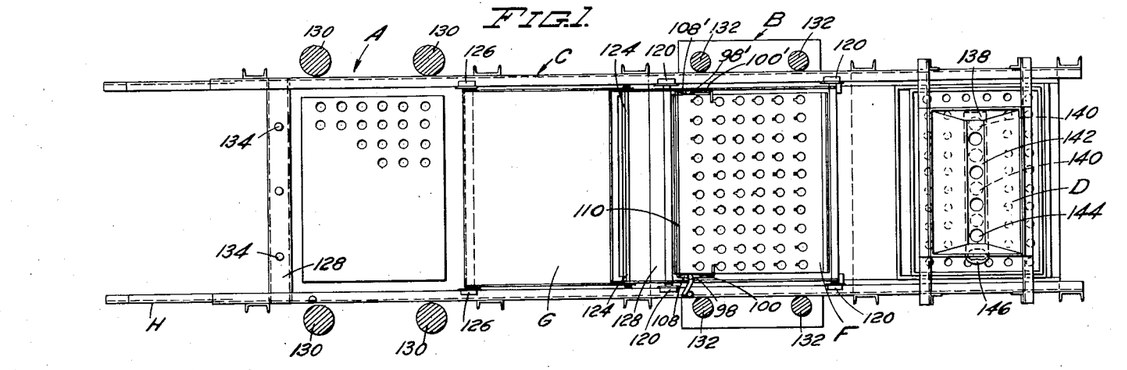
Fig. 1 is a partially sectioned plan view of apparatus embodying features of my invention.
Figure 2:
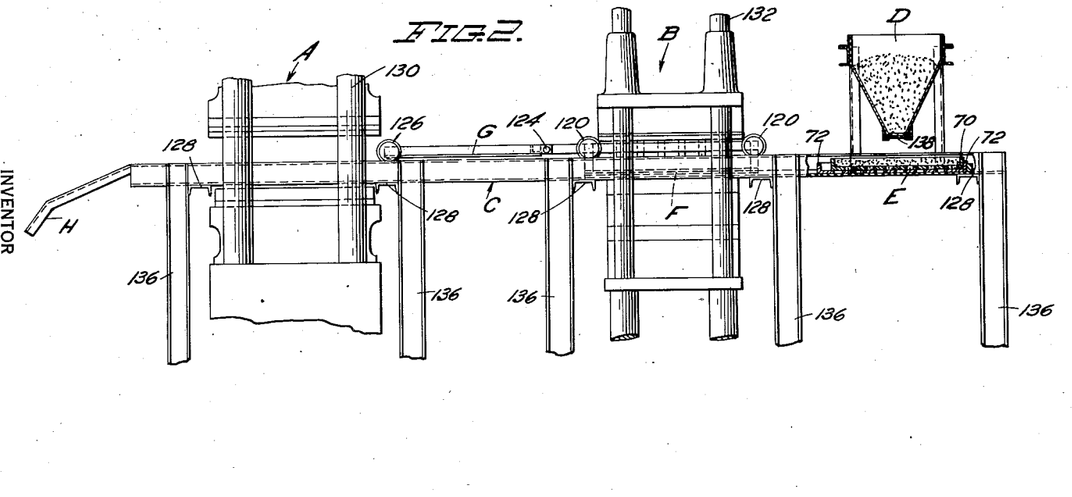
Fig. 2 is a partially sectioned side elevation thereof.

Referring to the drawings, particularly Figs. 1 and 2, the apparatus comprises a molding press A which may be and preferably is of conventional type. It further comprises a pill press generally designated B, said pill press B being connected to the molding press A by rails or guides C. A supply of molding powder is carried in a hopper D, from which a powder carrier E is loaded. The powder carrier E may be moved along guides C into the pill press B in order to load the pill cavities with molding powder. The apparatus further comprises a pillboard F which releasably receives the finished pills at the pill press and is then moved along the guides C into the molding press A, where the pills are deposited in the cavities of the mold carried in molding press A. A catchboard G is also provided, this catchboard being adapted to receive the finished pieces when they are stripped from the mold. The guides C extend beyond molding press A and are inclined or dropped, as shown at H, thus functioning to dump the molded pieces from the catchboard G when the catchboard is moved through and beyond the press.

Figure 4:
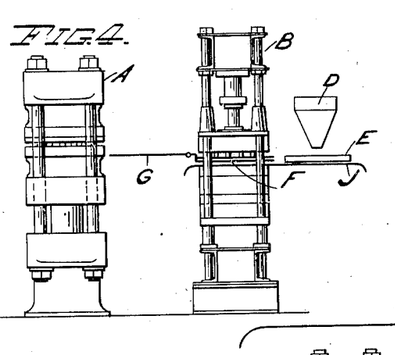
Fig. 4 is a diagrammatic view schematically showing the relation of the parts of the apparatus when the presses are closed.
Figure 5:
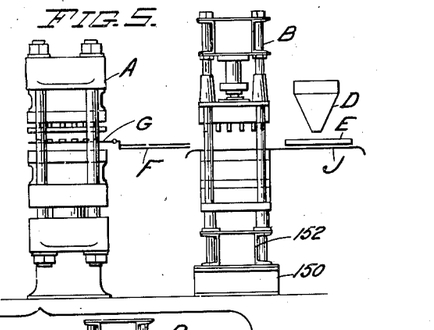
Fig. 5 is a similar view showing a later stage, with the presses open, and the finished pieces deposited on the catchboard.
Figures 6, 7, 8, 9:
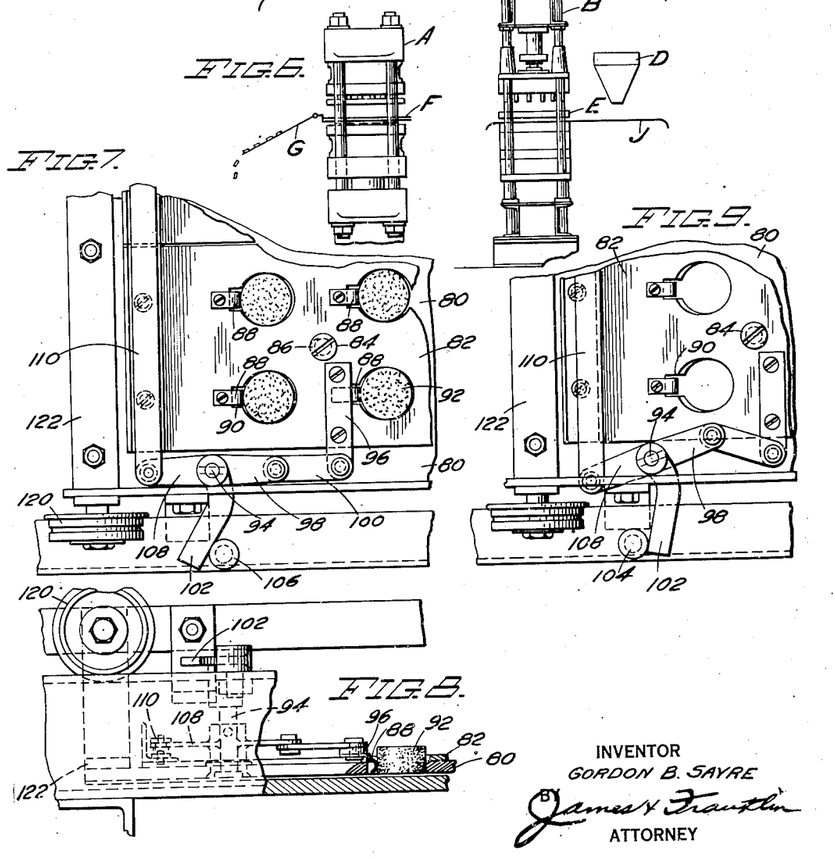
Fig. 6 is a similar view showing a still later stage, during the discharge of the finished pieces and the loading of the presses.
Fig. 7 is an elevation showing a part of the pillboard to enlarged scale.
Fig. 8 is a side elevation thereof.
Fig. 9 is a view similar to Fig. 7 but showing the automatic movement of the pillboard to release the pills.

The general method of operation may be briefly outlined by referring to Figs. 4, 5, and 6 of the drawings. The guides C have been omitted, and these figures are merely diagrammatic. In Fig. 4, the presses A and B are shown closed. Press B is forming pills or preforms, while press A is molding finished pieces out of pills previously formed in press B and then delivered to press A. The powder carrier E is withdrawn from press B and is disposed beneath the hopper D. The pillboard F and catchboard G have been withdrawn from press A, and pillboard F is located in press B, while catchboard G is located between presses A and B.

At the end of the molding cycle, the presses A and B are opened. As press B opens, the pills formed therein are delivered into the pill carrier F. When press A is only partially opened, the catchboard G and pill carrier F are moved to bring catchboard G into press A, as shown in Fig. 5. The continued opening of press A causes the molded pieces to be stripped from the mold and they fall on catchboard G. The catchboard and pillboard are then moved further, as shown in Fig. 6, thereby bringing the pillboard F into press A and moving catchboard G beyond the press where it is tilted to dump the molded pieces therefrom. When pillboard F is properly registered with the mold cavities in press A, the pillboard automatically releases the pills and drops the same into the mold cavities.

In the meantime, at any time after opening of press B and movement of pillboard F out of press B, the powder carrier E may be moved into press B, as shown in Fig. 6. In the specific arrangement here disclosed, the powder carrier E is slid along a stationary slideboard J. The powder carrier delivers powder to the pill cavities, and is then withdrawn from press B to its regular position beneath hopper D. The pillboard F and catchboard G are withdrawn from press A and moved all the way back to the position shown in Fig. 4, thus bringing both boards out of press A and bringing the pillboard F into press B. The presses are then again closed, the powder being treated under heat and pressure in press B to form a new set of pills, and the preceding set of pills being treated under heat and pressure in press A in order to form the desired finished pieces.

Figure 3:
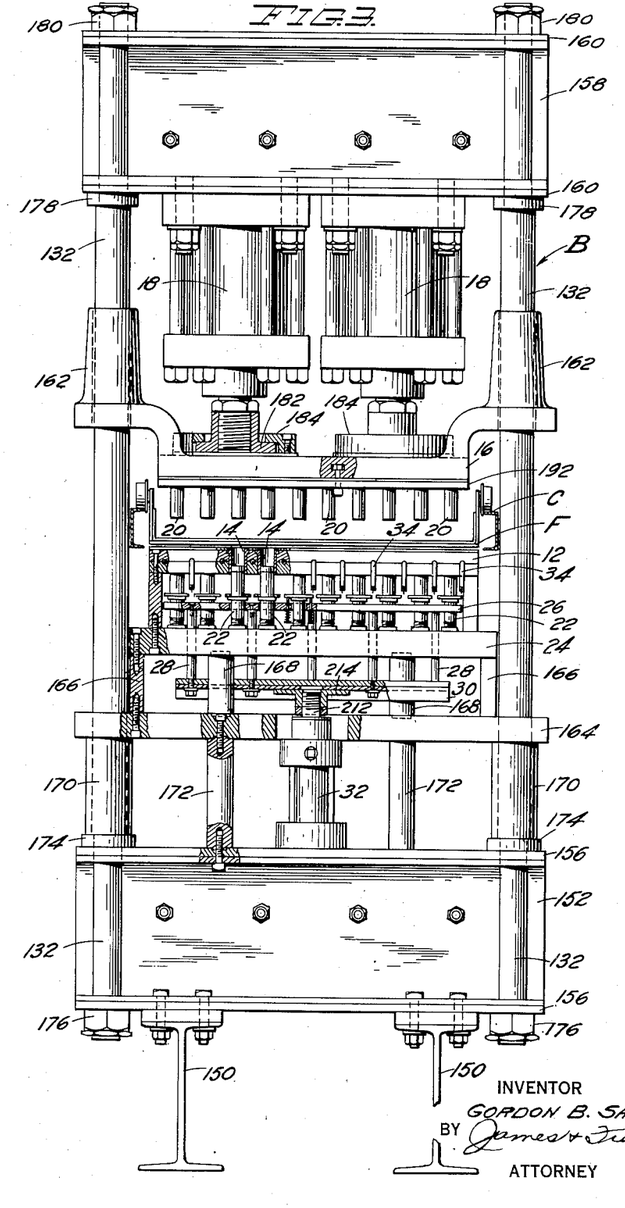
Fig. 3 is a partially sectioned elevation through the pill press, said elevation being taken transversely of Figs. 1 and 2.

Referring now to Fig. 3, this partially sectioned figure is an elevation of the pill press taken transversely of the guide rails C, that is, transversely of Figs. 1 and 2 of the drawings. The pillboard F is shown in the press, as in Figs. 1 and 2.

The pill press B comprises a cavity plate 12 having a plurality of pill cavities 14 therein. There is a movable platen 16 moved by one or more hydraulic piston and cylinder assemblies 18, said platen 16 carrying force plugs 20 mating with the pill cavities 14. The pill cavities are closed at the bottom by ejector plugs 22, the lower ends of which rest on stops carried by a stationary reaction plate 24. The ejector plugs 22 may be moved upwardly by means of an ejector plate 26, which in turn is moved through ejector rods 28 and plate 30 by a hydraulic piston and cylinder assembly 32. The cavity plate 12 is preferably heated, as by means of electrical heating units the ends of which are shown at 34.

Figures 11, 14, 15, 16, 17:
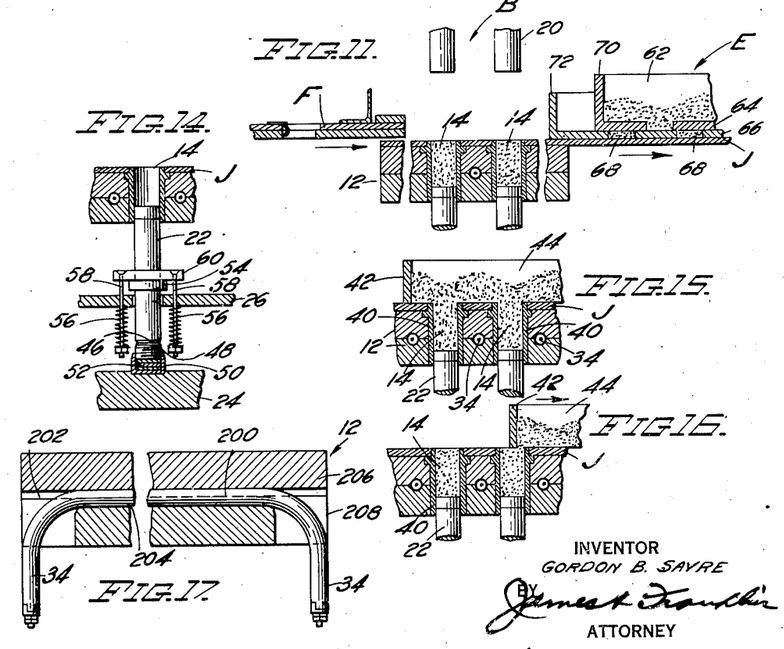
Fig. 11 is a similar view showing the movement of the powder carrier out of the press, and the movement of the pillboard into the press.
Fig. 14 is a diagonal section through a pill cavity and shows the restoring springs for the ejector plug.
Fig. 15 is a section through pill cavities and illustrates a modified form of powder carrier.
Fig. 16 is the same, but shows the powder carrier moving out of the pill press.
Fig. 17 is a section through the pill cavity plate and illustrates one of the Calrod heating elements therein.

The manner in which the pill cavities 14 are filled with molding powder may be explained with preliminary reference to Figs. 15 and 16 of the drawings. The mold cavities 14 are formed in cylinders 40 fixedly received in the platen 12, which is preferably a split platen, in order to facilitate the insertion of electric heating units 34 therein. The pill cavities 14 are closed at the bottom by the upper ends of ejector plugs 22. The slideboard J is stationarily mounted and closedy surrounds the upper ends of cylinders 40, the top of the slideboard being flush with the upper ends of the cylinders. The powder carrier may, in its most elemental form, consist merely of end walls 42 and side walls 44 defining an enclosed rectangular area as large as the mold area. The resulting four-sided frame rests directly on and fits closely against the slideboard J, the latter acting as a bottom wall for the powder in the powder carrier. When the powder carrier is moved over the mold cavities 14, the latter are filled with powder, as shown in Fig. 15. When the powder carrier is retracted from the pill press, the trailing end wall 42 sweeps excess powder before it and leaves the pill cavities just filled, as is clearly shown in Fig. 16. The depth of the pill cavity therefore determines the quantity of molding powder used to form each of the pills. This in turn depends on the downward position of the ejector plugs 22, which is preferably made adjustable.

Thus, referring to Fig. 14, the lower end 46 of ejector plug 22 rests on the upper surface of a stop plug 48 threadedly received in a member 50 resting on the main reaction plate 24. The thread is not relied on to take the reaction of the pressure of the pill, and instead the space beneath plug 48 is filled with a number of shims 52. The shims are appropriately varied to vary the content of the pill cavity 14, and plug 48 is screwed downwardly hard against the shims 52 so that the initial load on the threads is an upward thrust. The plug 48 is in the form of an Allen screw, its upper end being recessed to receive a wrench. The members 50 are preferably elongated blocks each carrying a number of stops 48 for one line of pill cavities. This facilitates removal and replacement when adjusting a stop at the middle of the press.

While discussing Fig. 14, it may be pointed out that ejector plug 22 is provided with a collar 54. The plug is normally urged downwardly against the stop 48 by means of springs 56, these being coiled about rods 58 the upper ends of which are received in a plate 60 apertured to pass plug 22 but not collar 54. The functioning of the ejector plate 26 will also be apparent, this ejector plate in its down position being clear of collar 54, but upward movement of the ejector plate moves it against collar 54 and thereupon elevates the ejector plug 22. Incidentally, it may be pointed out that all of the ejector plugs are brought to one elevation or level when they are being elevated by ejector plate 26, and this insures that the bottom of all of the pills will be brought up to a common level, preferably flush with the bottom of the pillboard.

Figure 10:
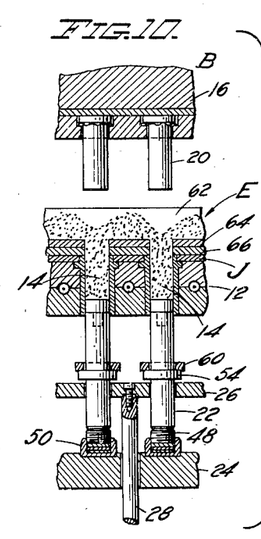
Fig. 10 is a fragmentary section through a part of the pill press, and shows the loading of the pill cavities with powder.

In actual practice, I prefer to provide the powder carrier with a bottom having relatively movable laminations arranged to exercise some valve control on the powder. Thus, referring to Fig. 10, the powder carrier, in addition to side wall 62, is shown with apertured bottom walls 64 and 66. The openings in these walls are in registration with one another and with the pill cavities 14. The molding powder thus falls freely into the mold cavities, much as was previously described. Referring now to Fig. 11, the powder carrier E is shown moving away from the pill press B. At this time, the bottom 64 is shifted relative to the bottom 66, thus bringing the apertures out of registration and relieving the slideboard J of powder, except for the comparatively tiny quantity of powder carried in the openings 68 of bottom lamination 66. This arrangement has the advantage over the more elemental arrangement of Figs. 15 and 16 of not relying too completely on the sealing action of slideboard J. In Fig. 11, it will be understood that the powder carrier comprises end walls 70 as well as side walls 62, these walls defining an area equal to that of the cavity plate. It will also be understood that suitable stops may be provided so relating the laminations 64 and 66 as to bring the openings therein into registration, as shown in Fig. 10, or out of registration, as shown in Fig. 11. In the present case, the stops consist merely of end walls 72 on lower lamination 66.

It will be understood that appropriate mechanism may be provided for moving the powder carrier into and out of the press B. In the present case, it is assumed to be moved manually by an operator. In moving the carrier into press B, it is merely necessary to push the outer end 72 of lower lamination 66, thus keeping the laminations in sealing relation. When the lower lamination has moved into the press and is in exact registration with the pill cavities, it strikes stops which prevent further movement. Any continued movement is applied to the upper lamination 64 and brings end wall 70 against stop wall 72, thus registering the openings in the powder carrier in order to load the pill cavities. On moving the powder carrier out of the press, a pull is applied to the outer end wall 70 of upper lamination 64, and this displaces the laminations and seals the bottom of the powder carrier as it is moved out of the press.

The manner in which the pills are formed and are subsequently delivered to the pillboard F may now be reviewed with reference to Figs. 10 through 13 of the drawings. In Fig. 10, the powder carrier E is disposed in open pill press B and the pill cavities 14 are loaded with powder. The ejector plate 26 is down and the ejector plugs 22 rest on stop plugs 48 carried by stationary reaction plate 24.

Referring now to Fig. 11, the press B remains open, and while open, the powder carrier E moves out of the press, leaving the pill cavities 14 filled flush to the top. The pillboard F moves into the open press until it strikes appropriate stops, at which time the pill-carrying openings therein are brought into accurate registration with the pill cavities 14.

Figure 12:
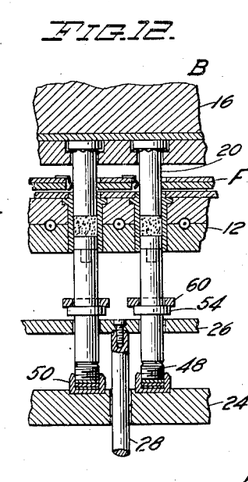
Fig. 12 is a view similar to Fig. 10, but showing the force plugs moved through the pillboard and into the pill cavities to form the pills.

The press then closes, as shown in Fig. 12, the platen 16 being moved downwardly and carrying the force plugs 20 down through the openings in pillboard F and into the pill cavities. The molding powder is compressed to a fraction, say, forty per cent of its original volume, and under the influence of heat and pressure, is transformed into a readily transferable unit.

Figure 13:
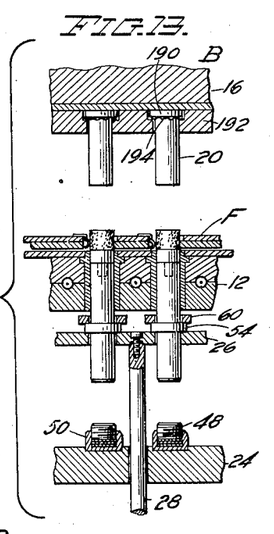
Fig. 13 is a similar view, but showing the press open and the ejector plugs elevated to move the finished pills into the pillboard.

The ejector plate 26 is then elevated, as shown in Fig. 13, thus forcing the pills upwardly out of the pill cavities and into the pillboard F. Platen 16 is preferably elevated more slowly than the ejector plate 26 (as by using only city water pressure on the under or return sides of the pistons in main cylinders 18, while using real hydraulic pressure in ejector cylinder 32), so that the pills are confined between the ejector plugs at the bottom and the force plugs at the top, while they are being moved upwardly and into the pillboard. This feature is important when dealing with pills having a diameter substantially greater than their thickness, in order to prevent tilting of the pills. When the ejector plate reaches its limit of upward movement, the lower ends of the pills are brought substantially flush with the bottom of the pillboard. The platen 16, with force plugs 20, continues rising until the pill press B is fully open, as in Fig. 13. Ejector plate 26 is lowered, and pillboard F may be moved out of the pill press in order to bodily transfer the array of pills to the molding press.

At the molding press, the pills are released, and the pill formed in any particular pill cavity is invariably transferred to a single corresponding mold cavity. Variations in the dimensions of the mold cavities may be compensated for by appropriate independent adjustment of the stop plugs 48 for each of the pill cavities. Thus, the dimensions of the pills are varied to properly fit the mold cavities, and each pill is made suitable for its particular mold cavity. The method of the present invention, therefore, includes preliminarily measuring out independently predetermined amounts of molding powder for each mold cavity, then simultaneously heating and compressing the measured amounts to form an array of pills, which are then bodily transferred to the mold, each pill being delivered to its corresponding mold cavity, whereupon the pills are subjected to heat and pressure in order to cure the same.

The use of heat in the pill press for preheating the pills may be carried well along because the operating cycle of the pill press and the molding press is a definite cycle, with immediate transfer of the pills from the pill press to the molding press. The apparatus may, therefore, be considered to be a two-stage molding apparatus comprising a first press B and a second press A connected by guides. Molding powder is delivered to the first press where it is treated under heat and pressure to form partially cured preforms which are then bodily transferred to the second press where the preforms are further treated under heat and pressure to completely react and to finish shaping the same. The amount of molding powder used in the preforms is independently adjustable in order to properly fill the corresponding molding cavities in the second press.

The construction of the pillboard F may be described in greater detail with reference to Figs. 7, 8, and 9 of the drawings. The pillboard comprises a lower lamination 80, and an upper lamination 82 which is movable relative to lower lamination 80. The amount of movement need only be slight, and the two laminations are secured together by screws 84 passing through slots 86 which permit and limit the desired relative movement. The upper lamination 82 carries springs 88. The upper ends of these springs are secured to lamination 82, and the lower ends are turned downwardly and curved, as is best shown in Fig. 8. Both laminations are preferably cut away to form slots 90, in which springs 88 are movable.

It will be evident that when the upper lamination 82 is moved to the right relative to lower lamination 80, the pills 92 will be held by the pillboard, the spring 88 bearing against the left-hand side of the pill, and the right-hand side of the pill bearing against lamination 80. The opening in upper lamination 82 is made oversize to permit movement to the left of lamination 82 relative to lamination 80, and it will be evident that when lamination 82 is moved to the left, the springs 88 are moved to the left, thus releasing their hold on the pills 92.

The relative movement of the laminations may be obtained by appropriate toggle mechanism. Specifically, a spindle 94 is mounted on lower lamination 80 and is connected to a strap 96, secured on upper lamination 82, by means of toggle links 98 and 100. In Figs. 7 and 8, these links are shown in alignment, thus moving upper lamination 82 toward the right. The toggle may be broken by means of an arm 102 secured to spindle 94. Thus, referring to Fig. 9, when the pill carrier is moved toward the left into the molding press A, the arm 102 strikes a stationary stop 104, thus swinging toggle link 98 inwardly, as shown, and thereby braking the toggle. This moves upper lamination 82 toward the left relative to lower lamination 80, and releases all of the pills so that they drop freely into the mold cavities.

Reverting to Fig. 7, a stop 106 may be provided, if desired, at the pill press B, thus causing closing of the pillboard when the pillboard is in registration with the pill cavities. This, because of the yieldability of the springs 88, does not interfere with passage of the force plugs downwardly through the pillboard, nor with loading of the pills upwardly into the pillboard. Nevertheless, if desired, the stop 106 may be omitted, and the pillboard may be left open during the pill-forming and pill-loading operation, whereupon the lever 102 will have to be operated either manually or through appropriate automatic means to close the pillboard in order to properly grip the same before the pillboard is moved out of the pill press toward the molding press.

The relative movement of the pillboard laminations is preferably made equal at both sides by the use of suitable parallel motion linkage.

In Figs. 7, 8, and 9, it will be observed that link 98 is extended on the opposite side of pin 94 to form an arm 108, which arm is connected to a link 110. Referring now to Fig. 1 of the drawings, it will be seen that link 110 extends across the pillboard and is connected to an arm 108', corresponding to the arm 108, and similarly, forming a part of a toggle mechanism 98', 100', like the toggle mechanism 98, 100 already described.

In Figs. 1 and 2, it will be noted that the pillboard is carried on a pillboard carriage having flanged wheels 120 running on the guide rails C. The pillboard F is suspended below the wheels 120 by means of suitable straps or brackets, one of which is shown at 122 in Figs. 7 through 9. The catchboard G is pivotally connected to the pillboard F by means of a rod 124 (Figs. 1 and 2). The catchboard is supported at its other end by wheels 126 which run on the rails C. The rails C are structural members which, in the particular case here shown, are U-shaped in section. The rails C are connected by a suitable number of cross connections 128. The spacing of the rails is such as to just fit within the pillars 130 of the molding press and the pillars 132 of the pill press. Any smaller spacing may, of course, be used, but in such case it might not be possible to employ maximum parting face area for the mold.

The cross connection 128 at the molding press end of the guides may be provided with stops 134 to arrest movement of the pillboard when it is in registration with the mold. The catchboard G is higher and readily passes over these stops.

The guides are supported on upright legs 136, which, in the present case, are made of structural members similar to those used for the guide rails.

The hopper D may be of any desired type and dimension. If filled only intermittently by hand, it should preferably be substantial in size, but if filled continuously by conveyor, it may be comparatively small. The discharge of powder from the hopper is controlled by suitable valve mechanism which, in this case, consists of a slide plate 138 having holes 140 therein. This plate is disposed beneath the bottom 142 of the hopper which is provided with a series of spaced holes 144. One end of plate 138 projects to form a handle 146. It will be evident that by shifting plate 138 by means of handle 146, the holes 140 and 142 may be brought into registration, whereupon powder is discharged into the powder carrier E, or out of registration, as shown in the drawings, whereupon discharge of powder is arrested.

Referring now to Fig. 3, the frame of the pill press is built up largely of massive structural members. Two I members 150 rest directly on the floor. Two U channel members 152 are secured transversely of the I members 150. The columns or tie rods 132 pass through the flanges of U members 152, as will be clearly seen from inspection of Figs. 3 and 5. The spacing of U members 152 is determined by connecting plates 156 at the top and bottom of the U members. The columns 132 are similarly joined at their upper ends by U members 158 which are connected by plates 160.

Movable platen 16 is provided with bearing bosses 162 which slide on columns 132. The stationary reaction plate 24 is supported on stationary plate 164 by means of blocks 166 and posts 168. Plate 164 is in turn supported by spacers 170 and posts 172. Spacers 170 rest on collars 174 which in turn take the reaction when nuts 176 are tightened at the lower ends of the columns. Similarly, collars 178 take the reaction of the nuts 180 at the upper ends of the columns.

The main cylinders 18 are secured to the U members 158 at the top of the press, and the reaction of these cylinders is taken by said members. The pistons are connected to the platen 16 by means of flanges 182 threadedly adjustably received on the piston rods, said flanges 182 bearing on the top of the platen and being held against upward movement by flanged rings 184 screwed to the platen. In this way, lateral adjustment is permitted.

The force plugs 20 are secured to platen 16 in a manner which will be clear from inspection of Figs. 10, 12 and 13. The upper ends of the force plugs are enlarged to form a head 190 (Fig. 13). This is received in a mating but oversized recess in a holding plate 192. The hole through which the force plug 20 passes is also oversize, thus permitting lateral movement of the force plug relative to the platen. A spring washer 194 is disposed between the lower side of head 190 and the bottom of the recess in plate 192. This spring member may, for example, be radially corrugated or otherwise treated to provide a spring grip, in an axial direction, on the head 190 of the force plug. Of course, the main downward pressure of the hydraulic rams is taken directly on the upper ends of the force plugs and heads 190, and there is no such force applied to the resilient members 194.

The reason for this construction is to provide for automatic self-adjustment of the force plugs in a lateral direction. This is desirable because the cavity plate 12 is heated, and the spacing of the cavities will be somewhat less when the cavity plate is cold than when it is hot. The self-adjustability of the force plugs permits them to cooperate with the pill cavities despite temperature variations. During most of the molding cycle, the force plug is in the pill cavity. Hence, any gradual change of position due to expansion of the pill plate exerts a lateral movement on the force plug which prepares it for its next stroke.

The heating of the cavity plate may be obtained in any known fashion, but is preferably obtained by the use of electric heating elements, preferably of the Calrod type. Referring to Fig. 17, the Calrod unit 200 is received in semi-cylindrical channels 202 and 204 in the upper and lower plates 206 and 208 respectively of the cavity plate 12. The ends of the units 200 are turned downwardly, as indicated at 34, and these down-turned ends also appear in Fig. 3. In practice, they are connected by appropriate electric wiring which has been omitted in the drawings. Two thermostatic elements are also disposed in cavity plate 12, and control the supply of current to the heating elements in order to maintain the temperature of the cavity plate at any desired value.

It has already been mentioned that the ejector plate 26 is connected by ejector rods 28 to a lower ejector plate 30. This is done in order to distribute the pressure throughout the rather extensive area of ejector plate 26. The pill cavities are located at close spacing, and by using a large number of ejector rods 28, the rods may be kept slender and therefore small enough to fit in the limited space available between the pill-forming units. The lower ejector plate 30 is mounted on the upper end of ejector plunger 212 by means of a flange 214. The downward force of the lower end of the ejector cylinder 32 is applied to the U members 152.

It is believed that the construction and operation, as well as the many advantages of my improved molding apparatus, will be apparent from the foregoing detailed description thereof. The use of heat, as well as pressure, in the pill press is very important. Heretofore, it was taught that pilling requires an enormous pressure. My apparatus uses only a tenth such pressure. This is very helpful when making a large number of pills simultaneously as in the present apparatus, for otherwise the pill press might have to be prohibitively large in capacity, instead of being a light press, as shown.

The heating of pills in the pill press while subjecting them to pressure is entirely different from heating of cold pills in an oven, because the pressure on the molding powder results in immediate thorough soaking of the heat throughout the pill. The heating of pills is valuable, not only to reduce the pressure and to increase the curing speed, etc., but also because a better product with a denser structure is obtained. In the case of bottle caps, for example, an increase in strength of twenty-five per cent is common, and all of the molding material is compacted into the cap without any waste or flash. The curing cycle is fast. The pill is small in dimension and fits well inside the mold cavity. Practically no mold cleaning is required. The pillboard and catchboard are here shown manually moved along the guide rails. It will be understood that they may be moved through the aid of chain and sprocket mechanism, as disclosed in my co-pending application, Serial No. 239,934, filed November 12, 1938, or may be moved entirely automatically under motor drive, as disclosed in my co-pending application, Serial No. 307,268, filed December 2, 1939. It will also be understood that while I have illustrated the application of the invention to a multiple cavity mold, in which the pill press makes one pill for each cavity, the invention may also be applied to a mold having a relatively large complex cavity requiring a plurality of pills, said pills being varied in shape, dimension and location to best fill the mold cavity.

The valve mechanism for controlling the hydraulic presses has not been illustrated and may be of conventional manually operated type. However, if desired, the valves of the two presses may be connected together for single control, and if desired, the valves may be automatically operated by mechanism disclosed in my co-pending application, Serial No. 239,933, filed November 12, 1938. In the present disclosure, the measurement of powder takes place directly in the pill cavity, but it will be understood that, if desired, the quantities of powder may be measured by separate apparatus and then delivered by a multiple chamber powder carrier to the pill cavities, each chamber carrying the powder for one particular pill cavity. For powder measuring apparatus of this character, reference may be made to my co-pending application, Serial No. 272,769, filed May 10, 1939.

It will, therefore, be apparent that while I have shown and described my invention in a preferred form, many changes and modifications may be made in the structure disclosed without departing from the spirit of the invention defined in the following claims.

I claim:

1. In the molding of plastics, the method which includes preliminarily measuring out independently predetermined amounts of molding powder for each part of a mold, compressing the measured amounts of molding powder simultaneously in pill cavities to form a plurality of pills, one for each mold part, ejecting the pills from the pill cavities and then bodily transferring the pills laterally, each to its corresponding part of the mold while open, and then closing the mold and thereby subjecting the pills to heat and pressure, whereby the mold parts receive independently predetermined amounts of molding material which may differ from one another so as to be properly related to the dimensions of the respective mold parts.

2. In the molding of plastics in a multiple cavity mold, the method which includes preliminarily measuring out independently predetermined amounts of molding powder for each mold cavity, compressing the measured amounts of molding powder simultaneously in pill cavities to form a plurality of pills, one for each mold cavity, ejecting the pills from the pill cavities and bodily transferring the pills laterally each to its corresponding open mold cavity, and then closing the mold and thereby subjecting the pills to heat and pressure, whereby each mold cavity receives an independently predetermined amount of molding material properly related to the dimensions of the particular mold cavity, said amounts differing from one another where necessary.

3. A two-stage molding process for the molding of plastics, said process including delivering independently predetermined measured amounts of powder to a plurality of preform cavities, heating and compressing the powder to make partially cured preforms, bodily transferring the preforms while hot to a mold and depositing the same in corresponding parts of the mold, and there treating the preforms under heat and pressure to more completely react and finish the same, the amount of molding powder in each preform being properly related to the particular part of the mold which later receives the same said amounts differing from one another where necessary.

4. A two-stage molding process for the molding of plastics in a multiple cavity mold, said process including delivering independently predetermined measured amounts of powder to a plurality of preform cavities, heating and compressing the powder to make partially cured preforms, bodily transferring the preforms while hot to a mold and depositing the same in a corresponding number of matingly related mold cavities, and there treating the preforms under heat and pressure to more completely react and finish the same, the amount of molding powder in each preform being properly related to the particular mold cavity which later receives the same said amounts differing from one another where necessary.

5. A two-stage molding apparatus comprising a single first press and a single second press connected by guides for cooperation solely with one another, a preform cavity in the first press, means to deliver molding powder to the preform cavity, means to heat and compress the molding powder in the preform cavity, means to bodily transfer the resulting preform from the preform cavity of the first press along said guides to the second press, and means to there treat the preform under heat and pressure to finish molding the piece said first press being used for cooperation solely with said second press, the arrangement being such that both presses may be closed for approximately the same time, the first press working on a preform next to be used in the second press, while the second press is working on the preform previously made in the first press, whereby the material is subjected to heat and pressure in the first press for about as long as it is subjected to heat and pressure in the second press.

6. A two-stage molding apparatus comprising a single first hydraulic press and a single second hydraulic press connected by guides for cooperation solely with one another, a plurality of preform cavities in the first press, means to heat said cavities, a finishing mold in the second press, means to deliver molding powder to the preform cavities, means to compress the molding powder in the heated preform cavities for a substantial time in order to make preforms, means to bodily transfer the heated preforms from the preform cavities of the first press along said guides to the second press and to there deposit the same in appropriate parts of the finishing mold said first press being used for cooperation solely with said second press, the arrangement being such that both presses may be closed for approximately the same time, the first press working on the plurality of preforms next to be used in the second press, while the second press is working on the plurality of preforms previously made in the first press, whereby the material is subjected to heat and pressure in the first press for about as long as it is subjected to heat and pressure in the second press.

7. A two-stage molding apparatus comprising first and second presses connected by guides, a plurality of heated preform cavities in the first press, a heated finishing mold in the second press, means to deliver thermosetting molding powder to the preform cavities, means to heat and compress the molding powder in the preform cavities to simultaneously make a plurality of partially cured preforms, means to bodily transfer the preforms simultaneously from the preform cavities of the first press along said guides to the second press and to deposit the same in appropriate parts of the finishing mold, means to there treat the preforms under heat and pressure to more completely react the same, and means to independently adjust the quantity of molding powder used in each of the preforms, whereby the preforms may be relatively differently dimensioned to properly fill their corresponding mold parts.

8. A two-stage molding apparatus comprising first and second presses, a plurality of heated preform cavities in the first press, a corresponding plurality of heated mold cavities in the second press, means to deliver thermosetting molding powder to the preform cavities, means to heat and compress the molding powder in the preform cavities to simultaneously make a plurality of partially cured preforms, means to bodily transfer the preforms simultaneously from the preform cavities of the first press to the second press and to deposit the same in the corresponding mold cavities, means to there treat the preforms under heat and pressure to more completely react the same, and means to independently adjust the quantity of molding powder used in each of the preforms, whereby the preforms may be relatively differently dimensioned to properly fill their corresponding mold cavities.

9. In combination, a molding press carrying a multiple cavity mold, means to heat said mold, a pill press having a stationary cavity plate with a plurality of pill cavities so relatively located as to correspond with the mold cavities of the mold, means to heat the pill cavities, and a pillboard having a plurality of pill-carrying parts registering with the mold cavities and pill cavities and thereby adapted to receive the heated pills directly from the pill cavities and to simultaneously transfer the same while hot to the mold cavities, whereby the pill formed in any particular pill cavity is invariably transferred to a single corresponding mold cavity, the pill carrying parts of said pillboard including elements which are relatively movable to grip the pills or to release the pills as desired.

10. In combination, a molding press carrying a multiple cavity mold, a pill press having a cavity plate with a plurality of pill cavities so relatively located as to correspond with the mold cavities of the mold, a pillboard having a plurality of pill-carrying parts registering with the mold cavities and pill cavities and thereby adapted to receive the pills directly from the pill cavities and to transfer the same to the mold cavities, whereby the pill formed in any particular pill cavity is invariably transferred to a single corresponding mold cavity, and means to independently adjust the weight of the pills being made in the pill press in order to thereby relatively compensate for variations in the relative size of the mold cavities.

11. In combination, a molding press, a pill press, a single pair of guides extending through and connecting the molding press and pill press, a pillboard movable along said guides between the pill press and the molding press, a catchboard movable along said guides, a powder carrier movable along said guides, said pillboard being arranged to receive a pill directly from the pill press and to transfer the same to the molding press, said catchboard being arranged to receive the molded piece at the molding press, and said powder carrier being arranged to deliver molding powder to the pill press while the pillboard is delivering a previously formed pill to the mold.

12. In combination, a molding press carrying a multiple cavity mold, a pill press having a cavity plate with a plurality of cavities so relatively located as to be registerable with the mold cavities of the mold, guides extending through and connecting the molding press and pill press, a pillboard movable along said guides between the pill press and the molding press, said pillboard having a plurality of pill-carrying parts registerable with the mold cavities in one position of the pillboard and registerable with the pill cavities in another position of the pillboard and thereby adapted to receive the pills directly from the pill cavities and to transfer the same to the mold cavities, whereby the pill formed in any particular pill cavity is invariably transferred to a single corresponding mold cavity, a powder carrier movable along said guides on that side of the pill press remote from the molding press, said powder carrier being arranged to deliver molding powder to the pill cavities while the pillboard is delivering previously formed pills to the mold cavities.

13. In combination, a molding press carrying a multiple cavity mold, a pill press having a cavity plate with a plurality of cavities so relatively located as to be registerable with the mold cavities of the mold, guides connecting the molding press and pill press, a pillboard movable along said guides between the pill press and the molding press, a powder carrier also movable along said guides, said pillboard having a plurality of pill-carrying parts registerable with the mold cavities in one position of the pillboard and registerable with the pill cavities in another position of the pillboard and thereby adapted to receive the pills directly from the pill cavities and to transfer the same to the mold cavities, whereby the pill formed in any particular pill cavity is invariably transferred to a single corresponding mold cavity, said powder carrier being arranged to deliver molding powder to the pill cavities, and means to independently adjust the weight of the pills in order to thereby relatively compensate for variations in the relative size of the mold cavities.

14. In combination, a molding press carrying a multiple cavity mold, a pill press having a cavity plate with a plurality of cavities so relatively located as to be registerable with the mold cavities of the mold, guides connecting the molding press and pill press, a pillboard movable along said guides between the pill press and the molding press, a catchboard movable along said guides, a powder carrier movable along said guides on that side of the pill press remote from the molding press, said pillboard having a plurality of pill-carrying parts registerable with the mold cavities in one position of the pillboard and registerable with the pill cavities in another position of the pillboard and thereby adapted to receive the pills directly from the pill cavities and to transfer the same to the mold cavities, whereby the pill formed in any particular pill cavity is invariably transferred to a single corresponding mold cavity, means to independently adjust the weight of the pills in order to thereby relatively compensate for variations in the relative size of the mold cavities, said catchboard being adapted to receive the molded pieces at the molding press, and said powder carrier being arranged to deliver molding powder to the pill cavities while the pillboard is delivering previously formed pills to the mold cavities.

15. A pill press for making plain simple-shaped potentially reactive heated pills out of a thermosetting molding powder preparatory to a subsequent molding operation, said pill press comprising a cavity plate, a plurality of vertically walled pill cavities therein, means to heat the cavity plate, a movable platen, means to move the same, a plurality of flat-ended vertically walled force plugs carried by said platen for downward movement into the pill cavities with a sliding or plunger-like fit, a plurality of flat-ended vertically walled ejector plugs projecting upwardly into and forming movable bottoms for the pill cavities, said ejector plugs having the same cross section as said force plugs and similarly having a sliding or plunger-like fit in said cavities, a stationary plate beneath the lower ends of said ejector plugs to take the pressure of the force plugs, an ejector plate operatively connected to said ejector plugs, and means to move the ejector plate upwardly in order to raise the ejector plugs so as to eject the only-partially-reacted pills from the pill cavities.

16. A pill press for making heated pills out of a thermosetting molding powder preparatory to a subsequent molding operation, said pill press comprising a cavity plate, a plurality of pill cavities therein, means to heat the cavity plate, a platen, means for moving said platen downward, a plurality of force plugs carried in holes in said platen, said holes being slightly larger in dimension than the plugs, whereby said plugs are laterally self-adjustably mounted on said platen to accommodate expansion or contraction of the cavity plate with changes in temperature, a part of said platen being disposed over the top ends of the plugs for positive downward pressure on the same, ejector plugs projecting upwardly into and forming movable bottoms for the pill cavities, an ejector plate operatively connected to said ejector plugs, and means to move the ejector plate upwardly in order to raise the ejector plugs so as to eject the only-partially-reacted pills from the pill cavities.

17. A pill press comprising a cavity plate, a plurality of pill cavities therein, means to heat the cavity plate, a platen, means for moving said platen, a plurality of force plugs carried by said platen for downward movement into the pill cavities with a sliding or plunger-like fit, ejector plugs projecting upwardly into and forming movable bottoms for the pill cavities, said ejector plugs having the same cross section as said force plugs and similarly having a sliding or plunger-like fit in said cavities, normally stationary bottom stops beneath the lower ends of said ejector plugs to take the pressure of the force plugs, means associated with each of said bottom stops for independently adjusting the elevation of said stops in order to independently vary the effective dimensions of the different pill cavities relative to one another, an ejector plate operatively connected to said ejector plugs, and means to move the ejector plate upwardly in order to raise the ejector plugs so as to eject the only-partially-reacted pills from the pill cavities.

18. A pill press comprising a cavity plate, a plurality of pill cavities therein, means to heat the cavity plate, thermostatic means to control the heating of the cavity plate, a platen, hydraulic piston and cylinder mechanism for moving said platen, a plurality of force plugs carried in holes in said platen, said holes being slightly larger in dimension than the plugs, whereby said plugs are laterally self-adjustably mounted on said platen to accommodate expansion or contraction of the cavity plate with changes in temperature, a part of said platen being disposed over the top ends of the plugs for positive downward pressure on the same, ejector plugs projecting upwardly into and forming movable bottoms for the pill cavities, bottom stops for said ejector plugs, said bottom stops being adjustable to independently vary the effective dimension of the pill cavities, an ejector plate connected to said ejector plugs, and means to move the ejector plate.

19. In combination, a molding press carrying a multiple cavity mold, a pill press having a cavity plate with a plurality of cavities so relatively located as to correspond with the mold cavities of the mold, force plugs arranged to be moved into or out of the pill cavities by the pill press, a pillboard comprising relatively movable laminations having openings therethrough larger than the pills, one of said laminations carrying springs adapted to bear against and hold the pills when the laminations are relatively moved in one direction and to release the pills when the laminations are relatively moved in opposite direction, the openings in the pillboard registering with the pill cavities, whereby the force plugs of the pill press may work through the pillboard into the pill cavities when forming the pills, ejector plugs arranged to eject the pills from the pill cavities into the pillboard, said pillboard being adapted to transfer the pills to the mold cavities, whereby the pill formed in any particular pill cavity is invariably transferred to a single corresponding mold cavity, and means automatically operated in response to movement of the pillboard into the molding press to so relatively move the laminations of the pillboard as to release the pills.

20. The method of molding a thermosetting material which includes first subjecting the molding material in powdered form to heat and pressure in a first press, opening said press and transferring the resulting preform while in heated condition directly to a second press, the pressure on the preform being completely relieved during the transfer to permit the escape of gases, and thereupon molding the hot preform by subjecting it to heat and pressure in a molding press, the time of treatment in the first press being about as long as the time of treatment in the second press.

21. Apparatus for molding a thermosetting material, said apparatus comprising a first press having a cavity, means to heat the same, a molding press having a cavity, means to heat the same, and means to transfer a preform while in heated condition from the heated cavity of the first press to the heated cavity of the molding press, said first press being used for cooperation solely with said molding press, the arrangement being such that both presses may be closed for approximately the same time, the first press working on a preform next to be used in the molding press, while the molding press is working on the preform previously made in the first press, whereby the material is subjected to heat and pressure in the first press for about as long as it is subjected to heat and pressure in the molding press.

22. The method of molding a large number of similar items out of a thermosetting material by means of first and second presses, each having the same large number of cavities, which method includes first subjecting a large number of bodies of molding material in powdered form simultaneously to heat and pressure in the first press, opening said press, simultaneously transferring the resulting large number of preforms while in heated condition directly to the second press, the pressure on the preforms being completely relieved during the transfer to permit the escape of gases, thereupon simultaneously molding the hot preforms by subjecting them simultaneously to heat and pressure in the second press, the time of treatment in the first press being about as long as the time of treatment in the second press.

23. Apparatus for molding a large number of similar items out of a thermosetting material, said apparatus comprising a first press having a large number of molding cavities for making preforms, means to heat the said cavities, a molding press having a similar large number of molding cavities, means to heat the same, means to simultaneously bodily transfer all of the preforms while in heated condition from the heated cavities of the first press to the heated cavities of the molding press, said first press being used for cooperation solely with said molding press so that both presses may be closed for approximately the same time, the first press working on the plurality of preforms next to be used in the molding press while the molding press is working on the plurality of preforms just previously made in the first press, whereby all of the items being made are subjected to heat and pressure in the first press for about as long as they are subjected to heat and pressure in the molding press.

GORDON B. SAYRE.